(12) United States Patent
Hou et al.

(10) Patent No.: US 7,733,458 B2
(45) Date of Patent: Jun. 8, 2010

(54) METHOD FOR MANUFACTURING AN ELECTRO-OPTIC DEVICE AND ELECTRO-OPTIC DEVICE, AND ARTICLE THEREFOR

(75) Inventors: Wei-Hsin Hou, Taipei (TW); Hsing-Lung Wang, Taoyuan County (TW); Chi-Chang Liao, Tainan (TW); Kang-Hung Liu, Hsinchu County (TW); Shie-Chang Jeng, Pingtung County (TW)

(73) Assignee: Industrial Technology Research Institute, Hsinchu (TW)

( * ) Notice: Subject to any disclaimer, the term of this patent is extended or adjusted under 35 U.S.C. 154(b) by 346 days.

(21) Appl. No.: 11/460,637

(22) Filed: Jul. 28, 2006

(65) Prior Publication Data

US 2007/0171351 A1    Jul. 26, 2007

Related U.S. Application Data

(60) Provisional application No. 60/762,660, filed on Jan. 26, 2006.

(51) Int. Cl.
*G02F 1/1339* (2006.01)
(52) U.S. Cl. .......................................... 349/155; 349/86
(58) Field of Classification Search ........................ None
See application file for complete search history.

(56) References Cited

U.S. PATENT DOCUMENTS 5,757,448 A * 5/1998 Takei ............................ 349/92
6,128,056 A * 10/2000 Kubota et al. ................. 349/86
2004/0012748 A1 * 1/2004 Freeman ...................... 349/155

OTHER PUBLICATIONS

Article titled "A New Technique for Preparing Monodisperse Polymer Particles. II. Phase Separation Mechanisms" jointly authored by Hou et al., Journal of Applied Polymer Science, vol. 54, pp. 1363-1369,1994.
Article titled "A New Technique for Preparing Monodisperse Polymer Particles" jointly authored by Hou et al., Journal of Applied Polymer Science, vol. 45, pp. 1783-1788, 1992.

* cited by examiner

*Primary Examiner*—Richard H Kim
(74) *Attorney, Agent, or Firm*—Jiang Chyun IP Office

(57) ABSTRACT

To obtain truly flexible electro-optic films for image display or other related applications and to obtain a low cost solution for making electro-optic films, a new concept for manufacturing such films is disclosed. The method disclosed in this invention include mixing liquid crystal with "sponge particles" having fibril or porous surface morphology, coating such mixture directly on substrates with conductive electrodes and laminating with release liner or another substrate having conductive electrodes. The electro-optic films manufactured by using traditional R2R coating techniques. The electro-optic film manufactured by the method disclosed in the invention can be used for segment type, passive matrix type or active matrix type display applications or other related applications.

18 Claims, 3 Drawing Sheets

METHOD FOR MANUFACTURING AN ELECTRO-OPTIC DEVICE AND ELECTRO-OPTIC DEVICE, AND ARTICLE THEREFOR

CROSS-REFERENCE TO RELATED APPLICATION

This application claims priority benefit of U.S. provisional patent application Ser. No. 60/762,660, filed on Jan. 26, 2006, and the entirety of the above-mentioned patent application is hereby incorporated by reference herein and made a part of this specification.

BACKGROUND OF THE INVENTION

1. Field of Invention

The present invention relates to an electro-optic device, a manufacture thereof and an article for the electro-optic device. More particularly, the present invention relates to a method for manufacturing an electro-optic device with a laminated structure, an electro-optic device, and an article for the electro-optic device.

2. Description of Related Art

The demands for flexible displays in commercial product applications such as e-signage, e-tag, e-book, smart cards, e-POP, . . . , etc. are increasing in recent years, especially when wireless infrastructure and digital technology have become more matured. Therefore, having a method which can be used to produce a low cost and good quality display with a flexible format will have a significant value to actual product applications.

There are several prior arts that have been proposed for manufacturing flexible display using roll-to-roll processes. However, each of them at least has some drawbacks as described below.

In a Polymer dispersed liquid crystal display (PDLC) or a polymer stabilized liquid crystal display (PSLC), these applications can not efficiently control the cell gap without proper spacers and can not efficiently control the uniformity of polymer phase and LC phase, which end up with a poor image quality.

In a Microcapsule approach application, this method can not provide uniform capsule spheres, so when the electro-optic media is coated on substrates, there are always a certain dielectric layer across the electro-optic media which resulted in high driving voltage. It is also difficult to produce black and white image display without properly mixing RGB microcapsules.

In a Microcup approach application, the display made by this method will always have a dielectric layer on the bottom of each cell which causes an additional potential drop and resulted in a higher driving voltage. It is also require a sealing layer in order to close the cell, which are difficult to implement and also create another potential drop during operation.

All of the prior arts including PDLC, PSLC, microcapsule and microcup approaches above can not add the alignment layer to the system, therefore, only a limited type of liquid crystal can be used. In addition, all of the prior arts approaches can not create a direct contact of electro-optic media with conductive electrode, therefore, it can only be used for potential driven (not current driven) devices. It is therefore desirable to provide a roll-to-roll process for fabricating flexible display to mitigate and/or obviate the aforementioned problems.

SUMMARY OF THE INVENTION

Accordingly, the present invention is directed to an electro-optic device with a laminated structure, an electro-optic device, and an article therefor.

In one embodiment, an electro-optic media is provided for an electro-optical device, in which the electro-optic media is laminated between two electrode substrates. The electro-optic media is made by mixing sponge particles with electro-optic materials. The sponge particles with uniform sizes are used as spacers to control cell gaps of the electro-optic materials during a printing process. The sponge particles have fibril or porous surface morphology which provides interaction with the molecules of the electro-optic material to create unique electro-optic properties of an electro-optical device.

A process of fabricating a flexible display according to the present invention comprises preparation of a paste by mixing the sponge particles with the liquid crystal, printing the paste on a first multi-layer electrode substrate, and forming a second multi-layer electrode substrate over the paste. The first multi-layer electrode substrate comprises a first substrate and a first conductive layer sequentially stacked, and the second multi-layer electrode substrate comprises a second substrate and a second conductive layer sequentially stacked. In one embodiment, the first multi-layer electrode substrate further comprises a first alignment layer, where the first substrate and the first conductive layer and the first alignment layer are sequentially stacked. In another embodiment, the second multi-layer electrode substrate further comprises a second alignment layer, where the second substrate and the second conductive layer and the second alignment layer are sequentially stacked.

In order to the make the aforementioned and other objects, features and advantages of the present invention comprehensible, a preferred embodiment accompanied with figures is described in detail below.

It is to be understood that both the foregoing general description and the following detailed description are exemplary, and are intended to provide further explanation of the invention as claimed.

BRIEF DESCRIPTION OF THE DRAWINGS

The foregoing summary as well as the following detailed description of the preferred embodiments of the present invention will be better understood when read in conjunction with the appended drawings. For the purposes of illustrating the invention, there are shown in the drawings embodiments which are presently preferred. It is understood, however, that the invention is not limited to the precise arrangements and instrumentalities shown.

DESCRIPTION OF EMBODIMENTS

The present invention provides an electro-optic media for an electro-optical device, in which the electro-optic media is laminated between two electrode substrates. The electro-optic media, which is referenced as "paste" hereinafter, is made by mixing sponge particles with electro-optic materials. The sponge particles with uniform sizes are used as spacers to control cell gaps of the electro-optic materials during a printing process. The sponge particles have fibril or porous surface morphology which provides interaction with the molecules of the electro-optic material to create unique electro-optic properties of an electro-optical device, such as a flexible liquid crystal display or an electro-optic modulator (EOM).

The sponge particles made by a precipitation process provide very good electro-optic properties by mixing with the electro-optic materials as electro-optic media in the electro-optical device. For example, if the paste is applied to form a flexible liquid crystal display and is made by mixing sponge particles with liquid crystal, the sponge particles are used as light scattering centers which significantly improve whiteness of display images. The sponge particles also create multi-domains after interacted with liquid crystal molecules which significantly improve viewing angle of display images. The sponge particles also provide interactions with liquid crystal molecules which significantly improve display image bistability. In a manufacturing method of a preferred embodiment of the present invention for the flexible liquid crystal display, alignment layers can be added to the display, therefore, a wide range of liquid crystal can be used. In addition, the method of the embodiment can provide a solution for direct contact of electro-optic media with the conductive electrode, so not only the potential driven electro-optic media can be used but also the current driven electro-optic media can be used.

If the paste of the embodiment of the present invention is applied to an electro-optic modulator (EOM), the sponge particles can also provide very good electro-optic properties by mixing with the electro-optic materials as electro-optic media in the electro-optic modulator. The electro-optic modulator (EOM) is an optical device in which a signal-controlled element displaying electro-optic effect is used to modulate a beam of light. The modulation may be imposed on the phase, frequency, amplitude, or direction of the modulated beam.

Figure 1:
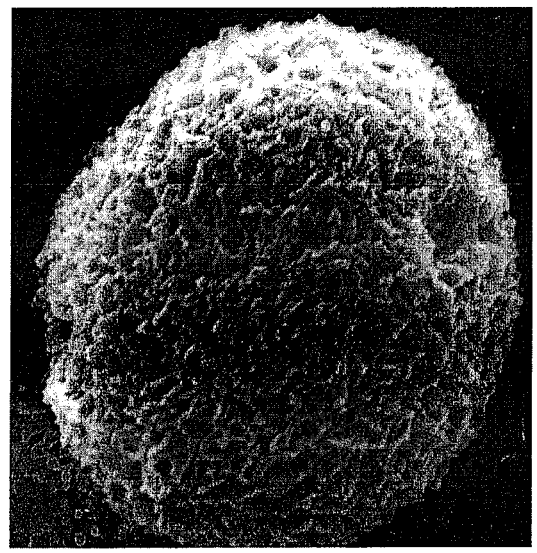
FIG. 1 is schematic diagrams illustrating a method of fabricating a mixture paste in accordance with one embodiment of the present invention.
Figure 1:
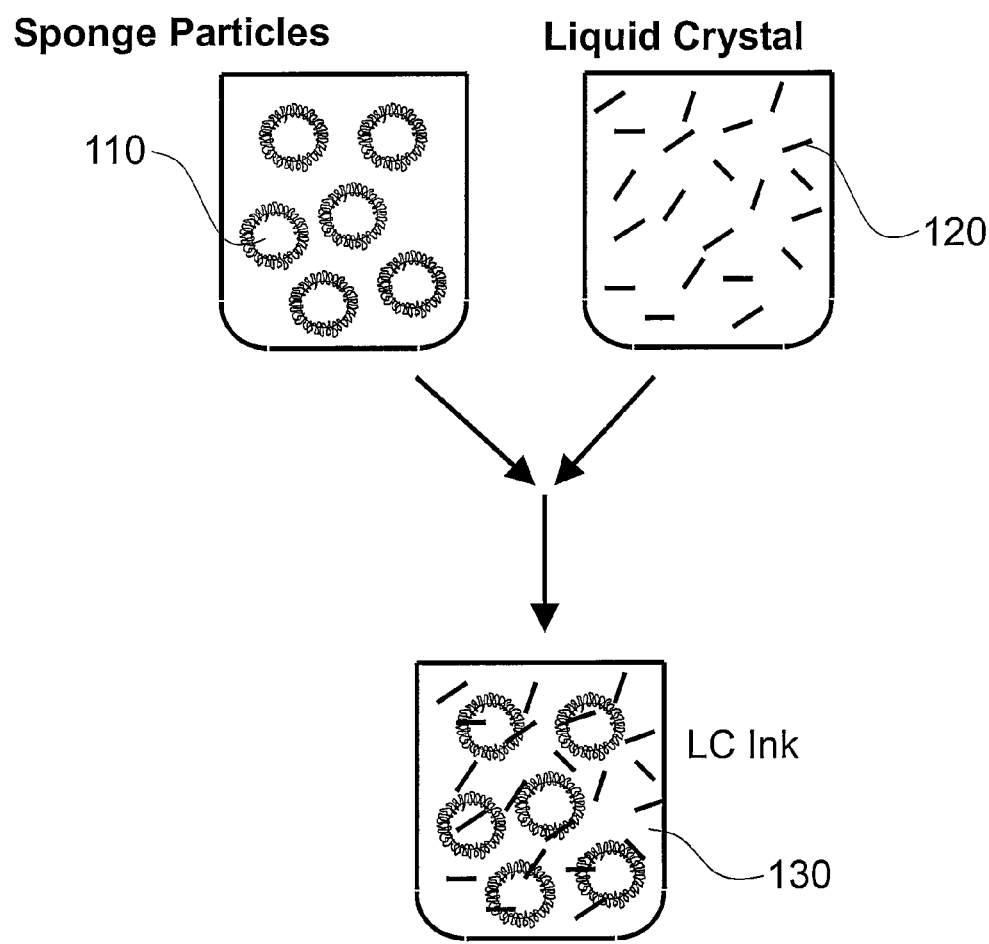

Please refer to FIG. 1, which shows a process for fabricating a paste of a preferred embodiment of the present invention. As described above, if the paste is applied to form a flexible liquid crystal display and is made by mixing sponge particles with liquid crystal, the sponge particles are used as light scattering centers which significantly improve whiteness of display images. The sponge particles are manufactured by precipitating a polymer from its solution using a cooling process as described in the reference "A New Technique for Preparing Monodisperse Polymer Particles. II. Phase Separation Mechanisms" in the Journal of Applied Polymer Science, Vol. 54, p. 1369 (1994) by Hou, one of the co-inventor of the patent, and W. H. & Lobuglio, T. M., where all disclosures therein are incorporated herewith by reference.

The manufacturing method for the sponge particles can be also described in the reference "A New Technique of Preparing Monodisperse Polymer Particles" in the Journal of Applied Polymer Science and Engineering, Vol. 45, p. 1783 (1992), by Hou, one of the co-inventor of the patent, and W. H. & Lloyd, T. B., where all disclosures therein are incorporated herewith by reference.

The sponge particles can be made of Nylon polymers or other similar types of polymers. The sponge particles, desired in the embodiment of the process for fabricating the paste requires uniform size distribution, and the precipitation process as described in references above can meet the requirements that the fabricated sponge particles have uniform size distribution and the sizes thereof can be controlled as desired. The fabricated sponge particles have fibril surface morphology which provides interactions with liquid crystal molecules to create unique electro-optic properties of a display. The fabricated sponge particles provide light scattering centers which significantly improve the whiteness of display images. The fabricated sponge particles create multi-domains after interacted with liquid crystal molecules which significantly improve viewing angle of display images. The fabricated sponge particles provide interactions with liquid crystal molecules which significantly improve display image bistability.

With reference to FIG. 1, the liquid crystal 120 can be nematic LC, cholesteric LC (ChLC), twisted nematic (TN), super twisted nematic (STN) or other types of liquid crystal. Different dichoric dyes can also be added to the mixture to form guest-host types of liquid crystal.

Figure 2A:
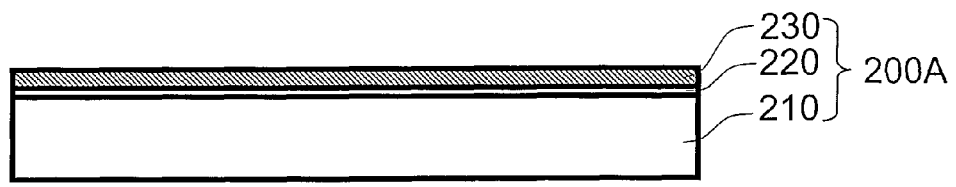
FIGS. 2A~2E show a process of fabricating an electro-optical device with electro-optic media laminated therein according to a preferred embodiment of the present invention.

Please refer to FIGS. 2A~2E, which show a process of fabricating an electro-optical device with electro-optic media laminated therein according to a preferred embodiment of the present invention. As shown in FIG. 2A, a multilayer electrode substrate 200A is provided as a carrier for electro-optic media in an electro-optical device. In the multilayer electrode substrate 200A, a alignment layer 230 is formed by, for example, a coating process on a substrate 210 containing a or a plurality of conductive electrodes 220 formed thereon. The substrate 210 can be made from polyethylene terephthalate (PET), polyethylene naphthalate (PEN), Polyether Sulfone (PES), Polycarbonate (PC), Polyimide (PI), epoxy materials, polymeric materials, glass materials, ceramic materials or inorganic materials. The conductive electrodes 220 can be metal electrodes such as Al, Cu, Mo, Ag, Au, . . . , etc., or transparent conductive materials such Indium Tin oxide (ITO), Antimony Tin oxide (ATO), Antimony Zinc oxide (AZO) or polymeric conductive materials. The conductive electrodes 220 can be a plain conductive layer or patterned conductive layers, as desired. The alignment layer 230 can be any alignment materials used in the field of electro-optical devices, such as alignment materials in liquid crystal display (LCD) industries. It is noted that adding the alignment layer 230 is an optional choice. For example, when cholesteric liquid crystal is used to form a liquid crystal display as described above, no alignment layer is needed.

Figure 2B:
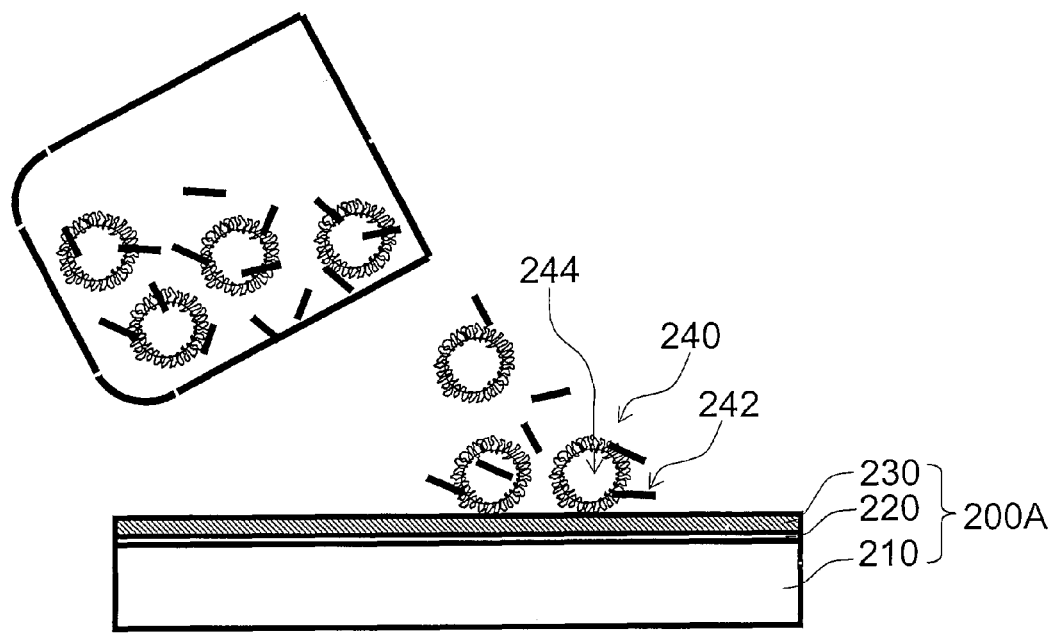

Please refer to FIG. 2B, the paste 240, which is mixture of sponge particles and liquid crystal, formed on the alignment layer 230 by, for example, a printing process. The printing process can be a regular coating technique such as screen printing, gravure printing, flexo printing, slot die coating or other printing/coating techniques used in the industries.

Figure 2C:
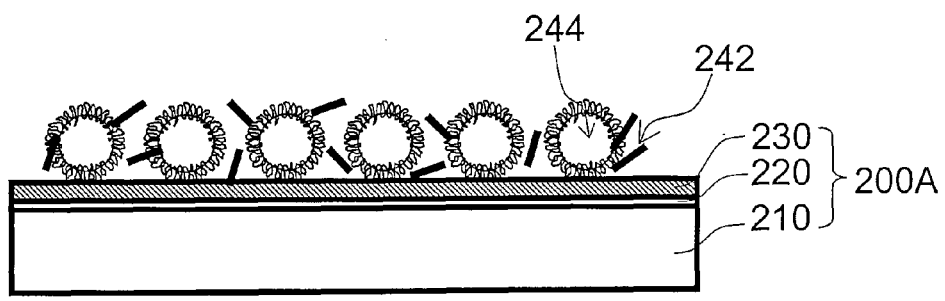

Please refer to FIG. 2C, the paste 240 is printed on the multilayer electrode substrate 200A. The sponge particles 244 with uniform sizes are used as spacers to control cell gaps of the electro-optic materials 242 during the printing process. The sponge particles 244 have fibril surface morphology which provides interaction with the molecules of the electro-optic material 242 to create unique electro-optic properties of a electro-optical device. The sponge particles 244 provide very good electro-optic properties by mixing with the electro-optic material 242 as electro-optic media in the electro-optical device. For example, if the paste is applied to form a flexible liquid crystal display, the sponge particles 244 are used as light scattering centers which significantly improve whiteness of display images. The sponge particles 244 also create multi-domains after interacted with liquid crystal molecules which significantly improve viewing angle of display images.

Figure 2D:
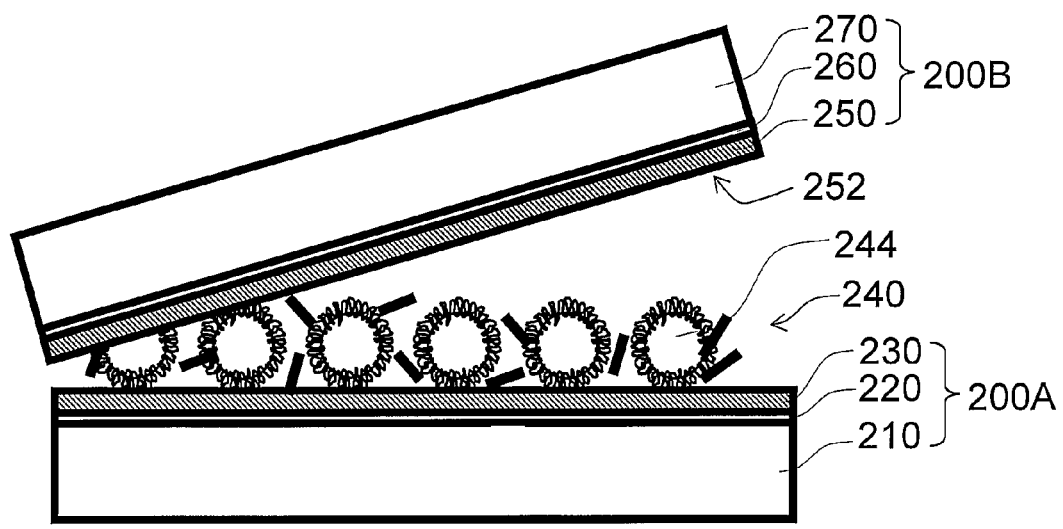

With reference to FIG. 2D, another multilayer electrode substrate 200B is provided for laminating the paste 240 on the multilayer electrode substrate 200A. The lamination process can be any lamination technique used in the industries. An edge sealing may be applied around the edge of the two substrates after lamination.

The multilayer electrode substrate 200B includes a alignment layer 250, a or a plurality of conductive electrodes 260 and an substrate 270 sequentially stacked together. An exposed side 252 of the alignment layer 250 is faced to the pasted 240 desired to be laminated. The alignment layer 250 is formed by, for example, a coating process on the substrate 270 containing the conductive electrodes 260 formed thereon. The substrate 270 can be made from polyethylene terephthalate (PET), polyethylene naphthalate (PEN), Polyether Sulfone (PES), Polycarbonate (PC), Polyimide (PI), epoxy materials, polymeric materials, glass materials, ceramic materials or inorganic materials. The conductive electrodes 260 can be metal electrodes such as Al, Cu, Mo, Ag, Au, . . . , etc., or transparent conductive materials such Indium Tin oxide (ITO), Antimony Tin oxide (ATO), Antimony Zinc oxide (AZO) or polymeric conductive materials. The conductive electrodes 260 can be a plain conductive layer or patterned conductive layers, as desired. The alignment layer 250 can be any alignment materials used in the field of electro-optical devices, such as alignment materials in liquid crystal display (LCD) industries. It is noted that adding the alignment layer 250 is an optional choice. For example, when cholesteric liquid crystal is used to form a liquid crystal display as described above, no alignment layer is needed.

Figure 2E:
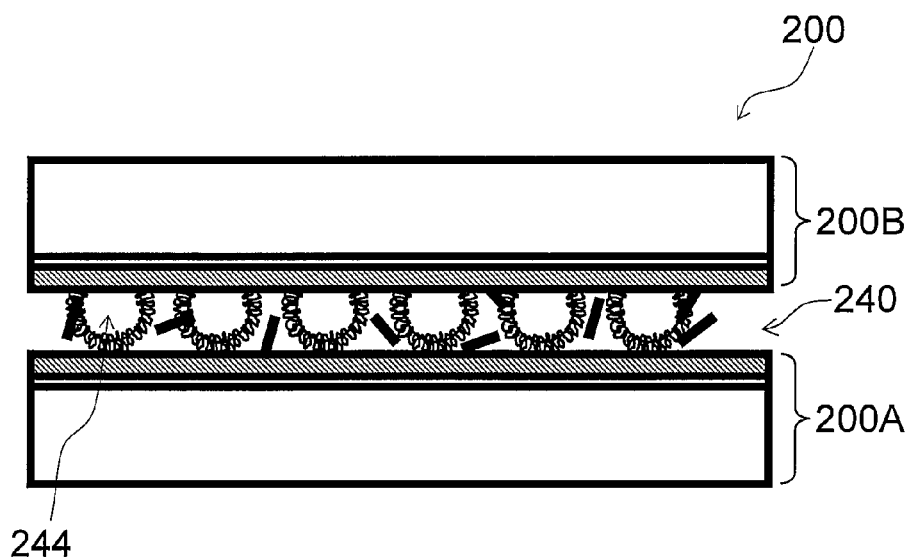

Please refer to FIG. 2E, a laminated structure 200 is formed by the multilayer electrode substrate 200A, the multilayer electrode substrate 200B, and the paste 240 formed therebetween. If the laminated structure 200 is used for a flexible liquid crystal display, the sponge particles 244 can be used as light scattering centers which significantly improve whiteness of display images. The sponge particles 244 also create multi-domains after interacted with liquid crystal molecules which significantly improve viewing angle of display images. The sponge particles also provide interactions with liquid crystal molecules which significantly improve display image bistability. In addition, the laminated structure 200 can provide a solution for direct contact of electro-optic media with the conductive electrode, so not only the potential driven electro-optic media can be used but also the current driven electro-optic media can be used.

The method disclosed in this invention contains "sponge particles" with uniform sizes which can be used as spacer to control cell gap during R2R coating/printing processes and also provide fibril structure to create interaction between liquid crystal and the particle surfaces to obtain good image quality especially having wide viewing angle and improved image whiteness. The method disclosed in this invention will not create any dielectric layer, therefore, the driving voltage can be significantly reduced. Also, the method disclosed in this invention can provide scattering centers from the incorporated sponge particles, therefore will be able to improve image whiteness. The method disclosed in this invention will not have such issue which can avoid any un-necessary potential drop during operation. Hence, the present invention provides a low cost solution for making flexible displays, and is used to manufacture reflective liquid crystal displays with black and white images without stacking multiple LCD layers or mixing different color liquid crystal capsules. The present invention also provides a method of making liquid crystal display structures which can create multi-domain for obtaining wide viewing angle, and provide scattering centers to obtain good black and white images. The present invention provides a method for manufacturing by R2R coating/printing processes while still can provide alignment layer having direct contact to liquid crystal molecules of LCD applications. The present invention provides a method for manufacturing by traditional R2R coating techniques to obtain high production yield purposes. The present invention provides a method for manufacturing electro-optic film for segment type, passive type and active type display applications.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

We claim:

1. A method of fabricating an electro-optic device, comprising:
   preparing a paste by mixing sponge particles with a liquid crystal to form the paste, wherein the sponge particles have fibril surface morphology which provides interactions with molecules of the liquid crystal;
   printing the paste on a first multilayer electrode substrate; and
   forming a second multilayer electrode substrate over the paste.

2. The method of claim 1, wherein the sponge particles comprises polymeric materials.

3. The method of claim 2, wherein the polymeric material is Nylon polymers.

4. The method of claim 1, wherein the liquid crystal is nematic LC, cholesteric LC (ChLC), twisted nematic (TN) or super twisted nematic (STN).

5. The method of claim 1, wherein the first multilayer electrode substrate comprises a first substrate and a first conductive layer, and the second multilayer electrode substrate comprises a second substrate and a second conductive layer.

6. The method of claim 5, wherein the first conductive electrode and the second conductive electrode are plain conductive layers.

7. The method of claim 5, wherein the first conductive electrode and the second conductive electrode are patterned conductive layers.

8. The method of claim 1, wherein the first multilayer electrode substrate comprises a first substrate, a first conductive layer and a first alignment layer sequentially stacked, and the second multilayer electrode substrate comprises a second substrate, a second conductive layer and a second alignment layer sequentially stacked.

9. The method of claim 1, the printing method is screen printing, gravure printing, flexo printing, slot die coating, inkjet printing, curtain coating, transfer coating and stamping.

10. A method of fabricating a liquid crystal display, comprising:
    preparing a paste by mixing sponge particles with a liquid crystal to form the paste, wherein the sponge particles have fibril surface morphology which provides interactions with molecules of the liquid crystal;
    printing the paste on a first multilayer electrode substrate; and
    forming a second multilayer electrode substrate over the paste.

11. A structure for an electro-optic device, comprising:
    a first multilayer electrode substrate comprising a first substrate and a first conductive layer sequentially stacked;
    a paste printed on the first multilayer electrode substrate, wherein the paste comprises sponge particles and liquid crystal mixed together, wherein the sponge particles have fibril surface morphology which provides interactions with molecules of the liquid crystal; and a second multilayer electrode substrate disposed on the paste, wherein the second multilayer electrode substrate comprises a second substrate and a second conductive layer sequentially stacked.

12. The structure of claim 11, wherein the first multilayer electrode substrate further comprises a first alignment layer, where the first substrate and the first conductive layer and the first alignment layer are sequentially stacked.

13. The structure of claim 11, wherein the second multilayer electrode substrate further comprises a second alignment layer, where the second substrate and the second conductive layer and the second alignment layer are sequentially stacked.

14. The structure of claim 11, wherein the sponge particles comprises polymeric materials.

15. The structure of claim 14, wherein the polymeric material is Nylon polymers.

16. The structure of claim 11, wherein the liquid crystal (LC) is nematic LC, cholesteric LC (ChLC), twisted nematic (TN) or super twisted nematic (STN).

17. The structure of claim 11, wherein the first conductive electrode and the second conductive electrode are plain conductive layers or patterned conductive layers.

18. A paste for an electro-optic device made of sponge particles and liquid crystal mixed together, wherein the sponge particles with uniform sizes server as spacers for controlling a cell gap during a printing process and are configured with fibril or porous structures for creating interaction between liquid crystal and surfaces of the sponge particles to obtain good image quality, wherein the sponge particles have fibril surface morphology which provides interactions with molecules of the liquid crystal.

* * * * *